United States Patent [19]
Jenkins

[11] Patent Number: 5,639,841
[45] Date of Patent: Jun. 17, 1997

[54] POLYMERS CONTAINING MACROMONOMER MIXTURES

[75] Inventor: Richard Duane Jenkins, Cary, N.C.

[73] Assignee: Union Carbide Chemicals & Plastics Technology Corporation, Danbury, Conn.

[21] Appl. No.: 395,450

[22] Filed: Feb. 28, 1995

[51] Int. Cl.$^6$ .................... C08F 216/12; C08F 228/02; C08F 226/02
[52] U.S. Cl. .................... 526/333; 526/286; 526/301
[58] Field of Search .................... 526/333, 286, 526/301

[56] References Cited

U.S. PATENT DOCUMENTS

| | | | |
|---|---|---|---|
| Re. 33,008 | 8/1989 | Ruffner et al. | 526/270 |
| Re. 33,156 | 1/1990 | Shay et al. | 526/301 |
| Re. 34,093 | 10/1992 | Powell et al. | 524/228 |
| 3,729,439 | 4/1973 | Parker | 260/29.7 |
| 3,801,524 | 4/1974 | Parker | 260/29.6 |
| 3,842,059 | 10/1974 | Milkovich et al. | 260/93.5 A |
| 3,917,666 | 11/1975 | Fabris et al. | 260/465.4 |
| 3,996,309 | 12/1976 | Dowbenko et al. | 260/874 |
| 4,085,168 | 4/1978 | Milkovich et al. | 260/886 |
| 4,353,818 | 10/1982 | Maslanka et al. | 524/458 |
| 4,403,063 | 9/1983 | Maslanka et al. | 524/458 |
| 4,426,483 | 1/1984 | Maslanka et al. | 524/460 |
| 4,429,097 | 1/1984 | Chang et al. | 526/317 |
| 4,442,261 | 4/1984 | Kennedy et al. | 525/324 |
| 4,501,855 | 2/1985 | Noren | 525/218 |
| 4,514,552 | 4/1985 | Shay et al. | 526/301 |
| 4,552,685 | 11/1985 | Kernstock et al. | 252/355 |
| 4,554,324 | 11/1985 | Husman et al. | 525/301 |
| 4,559,159 | 12/1985 | Denzinger et al. | 252/174.24 |
| 4,567,234 | 1/1986 | Meunier | 525/73 |
| 4,567,239 | 1/1986 | Mancinelli | 525/309 |
| 4,600,761 | 7/1986 | Ruffner et al. | 526/270 |
| 4,695,608 | 9/1987 | Engler et al. | 525/308 |
| 4,703,080 | 10/1987 | Shay et al. | 524/555 |
| 4,722,962 | 2/1988 | Shay et al. | 524/548 |
| 4,734,454 | 3/1988 | Aihara et al. | 524/555 |
| 4,735,981 | 4/1988 | Rich et al. | 524/247 |
| 4,743,698 | 5/1988 | Ruffner et al. | 549/478 |
| 4,745,154 | 5/1988 | Ruffner | 524/801 |
| 4,746,714 | 5/1988 | Spinelli et al. | 525/286 |
| 4,826,618 | 5/1989 | Borseth et al. | 252/174.21 |
| 4,872,885 | 10/1989 | Tsubakimoto et al. | 44/51 |
| 4,916,183 | 4/1990 | Barron et al. | 524/555 |
| 4,952,626 | 8/1990 | Kordomenos et al. | 525/28 |
| 4,988,771 | 1/1991 | Takeuchi et al. | 525/276 |
| 5,006,582 | 4/1991 | Mancinelli | 524/271 |
| 5,011,978 | 4/1991 | Barron et al. | 560/221 |
| 5,013,787 | 5/1991 | Barron et al. | 524/555 |
| 5,015,711 | 5/1991 | Simonet et al. | 526/301 |
| 5,028,677 | 7/1991 | Janowicz | 526/329.7 |
| 5,051,464 | 9/1991 | Johnson et al. | 524/555 |
| 5,057,241 | 10/1991 | Merritt et al. | 252/174.17 |
| 5,066,710 | 11/1991 | Simonet et al. | 524/555 |
| 5,066,759 | 11/1991 | Hille et al. | 528/60 |
| 5,070,147 | 12/1991 | Ozaki et al. | 525/285 |
| 5,076,844 | 12/1991 | Fock et al. | 106/35 |
| 5,077,347 | 12/1991 | Yabuta et al. | 524/504 |
| 5,086,142 | 2/1992 | Fock et al. | 526/318 |
| 5,093,412 | 3/1992 | Mente et al. | 525/762 |
| 5,109,091 | 4/1992 | Schafheutle et al. | 526/301 |
| 5,114,600 | 5/1992 | Biggin et al. | 252/86 |
| 5,124,393 | 6/1992 | Ingle et al. | 524/458 |
| 5,133,898 | 7/1992 | Fock et al. | 252/356 |
| 5,133,992 | 7/1992 | Nair et al. | 427/213.34 |
| 5,134,186 | 7/1992 | Ingle et al. | 524/548 |
| 5,147,576 | 9/1992 | Montague et al. | 252/174 |
| 5,153,259 | 10/1992 | Padget et al. | 524/591 |
| 5,153,273 | 10/1992 | Kobayashi | 525/412 |
| 5,155,172 | 10/1992 | Siol et al. | 525/308 |
| 5,164,454 | 11/1992 | Suga et al. | 525/309 |
| 5,169,719 | 12/1992 | Balatan | 428/423.1 |
| 5,177,165 | 1/1993 | Valint, Jr. et al. | 526/245 |
| 5,192,592 | 3/1993 | Shay | 427/358 |
| 5,192,616 | 3/1993 | Babu | 428/407 |
| 5,256,724 | 10/1993 | Biale | 524/556 |
| 5,292,843 | 3/1994 | Jenkins et al. | 526/318.5 |
| 5,294,692 | 3/1994 | Barron et al. | 526/301 |
| 5,294,693 | 3/1994 | Ergraz et al. | 526/310 |
| 5,320,672 | 6/1994 | Whalen-Shaw | 106/287.24 |
| 5,399,618 | 3/1995 | Jenkins et al. | 524/817 |

Primary Examiner—Joseph L. Schofer
Assistant Examiner—Wu C. Cheng
Attorney, Agent, or Firm—W. K. Volles

[57] ABSTRACT

This invention relates to polymers which comprise the reaction product of:

(A) about 1–99.8 weight percent of one or more nonionic, cationic, anionic or amphoteric monomers;

(B) about 0–98.8 weight percent of one or more monoethylenically unsaturated monomers different from (A);

(C) about 0.1–98.8 weight percent of one or more monoethylenically unsaturated macromonomers different from (A) and (B);

(D) about 0.1–98.8 weight percent of one or more monoethylenically unsaturated macromonomers different from (A), (B) and (C);

(E) about 0–20 weight percent or greater of one or more polyethylenically unsaturated monomers different from (A), (B), (C) and (D); and (F) about 0–25 weight percent or greater of one or more acrylates and/or methacrylates derived from a strong acid or a salt of a strong acid different from components (A), (B), (C), (D) and (E). The polymers of this invention are especially useful as thickeners and dispersants for aqueous systems, especially latex paints.

7 Claims, No Drawings

POLYMERS CONTAINING MACROMONOMER MIXTURES

RELATED APPLICATIONS

The following are related, commonly assigned applications, filed on an even date herewith: U.S. patent application Ser. No. 08/395,720, copending, and U.S. patent application Ser. No. 08/395,440, copending, both of which are incorporated herein by reference.

BRIEF SUMMARY OF THE INVENTION

Technical Field

This invention relates to polymers which contain macromonomer mixtures and which can contain nonionic, cationic, anionic and/or amphoteric monomers, and to dispersions and coating compositions containing said polymers. The polymers of this invention are especially useful as thickeners and dispersants for aqueous systems, especially latex paints.

Background of the Invention

Thickeners for aqueous systems are needed for various purposes, such as for architectural coatings, industrial coatings, automotive coatings and the like to improve rheology of the coatings. Also, any industry using pigments, fillers, or other solids needs to stabilize the system from the time of manufacture to the time of use. Because solid particles have densities that are larger than that of the liquid medium in which they are suspended, they tend to settle due to gravity. Dispersants provide the desired stability.

The typical waterborne latex paint contains pigment (often titanium dioxide), latex, clay extenders, pigment dispersants, colorants, rheology modifiers (thickeners), antifoam agent, coalescent, metal oxides (such as zinc oxide), and fungicide. Without dispersants and thickeners, a satisfactory waterborne latex paint could not be made. There is a continuing need for dispersants and thickeners that provide desired latex paint stability and rheology without negatively influencing other latex paint properties such as in-can viscosity stability, color acceptance, colorant float, and film properties of the paint: wet and dry film opacity, adhesion to various substrates, film gloss, and the water and alkali-resistance of the dry film.

Disclosure of the Invention

This invention relates in part to polymers comprising the reaction product of:

(A) about 1–99.8, preferably about 10–70, weight percent of one or more nonionic, cationic, anionic and/or amphoteric monomers;

(B) about 0–98.8, preferably about 30–85, weight percent of one or more monoethylenically unsaturated monomers, typically ethyl acrylate, different from component (A);

(C) about 0.1–98.8, preferably about 5–60, weight percent of one or more monoethylenically unsaturated macromonomers different from components (A) and (B);

(D) about 0.1–98.8, preferably about 5–60, weight percent of one or more monoethylenically unsaturated macromonomers different from components (A), (B) and (C);

(E) about 0–20, preferably about 0–10, weight percent or greater of one or more polyethylenically unsaturated monomers, typically trimethylol propane triacrylate, different from components (A), (B), (C) and (D); and (F) about 0–25, preferably about 0.1–25, weight percent or greater of one or more acrylates and/or methacrylates derived from a strong acid or a salt of a strong acid, typically 2-sulfoethyl methacrylate, different from components (A), (B), (C), (D) and (E). For purposes of this invention, the above-identified polymer is considered a dispersant when the molecular weight is less than about 50,000 and a thickener when the molecular weight is greater than about 50,000. However, it is appreciated that some dispersants cause thickening and some thickeners cause dispersing of particles.

This invention also relates in part to an emulsion of the above-identified polymer in water, which emulsion is useful as a thickening or dispersing agent in aqueous compositions. In order to obtain the thickening effect, the thickener is dissolved in the aqueous composition to be thickened. In order to obtain the dispersing effect, the dispersant is dissolved in the aqueous composition containing particles.

This invention further relates in part to an aqueous composition, and more particularly an improved latex paint composition containing the above-defined polymer.

This invention yet further relates in part to a process for thickening an aqueous composition which comprises adding the above-defined thickener to an aqueous composition and dissolving the thickener in the aqueous composition.

This invention also relates in part to a process for dispersing an aqueous coating composition containing particles which comprises adding the above-defined dispersant to said aqueous coating composition and dissolving the dispersant therein.

Detailed Description

Illustrative nonionic, cationic, anionic and amphoteric monomers useful in this invention include those monomers which impart water solubility to the polymer. Preferably, a large proportion of component (A) is employed to impart water solubility to the polymers of this invention. The key to water solubility lies in positioning sufficient numbers of hydrophilic functional groups along the backbone or side chains. Suitable functional groups which impart water solubility and suitable nonionic, cationic, anionic and amphoteric monomers useful in this invention are described in Water-Soluble Polymers, Synthesis, Solution Properties and Applications, ACS Symposium Series 467, American Chemical Society (1991), which is incorporated herein by reference. Mixtures of nonionic, cationic, anionic and amphoteric monomers may be employed in this invention, e.g., mixtures of nonionic monomers, mixtures of nonionic and cationic monomers, etc.

Illustrative nonionic monomers useful in this invention include, for example, acrylamide, N, N-dimethyl acrylamide, vinyl pyrrolidone, ethylene oxide, vinyl alcohol, vinyl acetate, N-vinylpyrrolidinone, hydroxyethyl acrylate, phosphate-containing monomers and the like including mixtures thereof. Illustrative cationic monomers useful in this invention include, for example, ammonium, sulfonium and phosphonium salts, preferably quarternary ammonium salts such as diallyldimethylammonium chloride, diallyldiethylammonium chloride, diethylaminoethyl methacrylate, dimethylaminoethyl methacrylate, methacryloyloxyethyltrimethylammonium sulfate, methacryloyloxyethyltrimethylammonium chloride, 3-(methacrylamido)propyltrimethylammonium chloride and the like including mixtures thereof.

Illustrative anionic monomers useful in this invention include, for example, acrylic acid, methacrylic acid, maleic anhydride, p-styrene carboxylic acids, p-styrene sulfonic acids, vinyl sulfonic acid, 2-sulfoethyl methacrylate, 3-sulfopropyl methacrylate, 3-sulfopropyl acrylate, 2-acrylamido-2-methylpropane sulfonic acid, 3-acrylamido-3-methylbutanoic acid, vinyl phosphonic acid, other phosphate-containing monomers and the like including mixtures thereof and salts thereof. Illustrative amphoteric monomers useful in this invention contain zwitterions on the same monomers, i.e., betaines, or along the same polymer backbone, i.e., ampholytes, and include, for example, N,N-dimethyl-N-methacryloxyethyl-N-(3-sulfopropyl) ammonium-betain, N,N-dimethyl-N-methacryl-amidopropyl-N-(3-sulfopropyl)ammonium-betain, 1-(3-sulfopropyl)-2-vinylpyridinium-betain, 3-(2-acrylamido-2-methyl-propyldimethylammonio)- 1-propanesulfonate, N-vinylpyrrolidone-co-N,N-dimethyl-N-methacroyloxyethylammoniopropanesulfonate, N-vinyl-pyrrolidone-co-N,N-dimethyl-N-methacroylamidopropylammoniopropanesulfonate, N-vinylpyrrolidone-co-2-vinylpyridiniopropanesulfonate and the like including mixtures thereof.

Preferably, a large proportion of one or more alpha, betamonoethylenically unsaturated carboxylic acid monomers can be present in the polymers of this invention. Various carboxylic acid monomers can be used, such as acrylic acid, methacrylic acid, ethacrylic acid, alpha-chloroacrylic acid, crotonic acid, fumaric acid, citraconic acid, mesaconic acid, itaconic acid, maleic acid and the like including mixtures thereof. Methacrylic acid is preferred. A large proportion of carboxylic acid monomer is essential to provide a polymeric structure which will solubilize and provide a thickener when reacted with an alkali like sodium hydroxide.

The polymers of this invention can also contain a significant proportion of one or more monoethylenically unsaturated monomers (i.e., component (B)). The preferred monomers provide water insoluble polymers when homopolymerized and are illustrated by acrylate and methacrylate esters, such as ethyl acrylate, butyl acrylate or the corresponding methacrylate. Other monomers which can be used are styrene, alkyl styrenes, vinyl toluene, vinyl acetate, vinyl alcohol, acrylonitrile, vinylidene chloride, vinyl ketones and the like. Nonreactive monomers are preferred, those being monomers in which the single ethylenic group is the only group reactive under the conditions of polymerization. However, monomers which include groups reactive under baking conditions or with divalent metal ions such as zinc oxide may be used in some situations, like hydroxyethyl acrylate.

Other illustrative monoethylenically unsaturated monomers useful in this invention include, for example, propyl methacrylate, isopropyl methacrylate, butyl methacrylate, n-amyl methacrylate, sec-amyl methacrylate, hexyl methacrylate, lauryl methacrylate, stearyl methacrylate, ethyl hexyl methacrylate, crotyl methacrylate, cinnamyl methacrylate, oleyl methacrylate, ricinoleyl methacrylate, hydroxy ethyl methacrylate, hydroxy propyl methacrylate, vinyl propionate, vinyl butyrate, vinyl tert-butyrate, vinyl caprate, vinyl stearate, vinyl laurate, vinyl oleate, vinyl methyl ether, vinyl ethyl ether, vinyl n-propyl ether, vinyl iso-propyl ether, vinyl n-butyl ether, vinyl iso-butyl ether, vinyl iso-octyl ether, vinyl phenyl ether, a-chlorovinyl phenyl ether, vinyl/-naphthyl ether, methacryonitrile, acrylamide, methacrylamide, N-alkyl acrylamides, N-aryl acrylamides, N-vinyl pyrrolidone, N-vinyl-3morpholinones, N-vinyl-oxazolidone, N-vinyl-imidazole and the like including mixtures thereof.

The macromonomers useful in this invention (i.e., component (C)) can be represented by the formula:

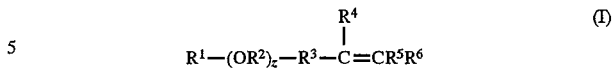

wherein:

$R^1$ is a monovalent residue of a substituted or unsubstituted complex hydrophobe compound;

each $R^2$ is the same or different and is a substituted or unsubstituted divalent hydrocarbon residue;

$R^3$ is a substituted or unsubstituted divalent hydrocarbon residue;

$R^4$, $R^5$ and $R^6$ are the same or different and are hydrogen or a substituted or unsubstituted monovalent hydrocarbon residue; and z is a value of 0 or greater.

The macromonomers useful in this invention (i.e., component (D)) can be represented by the formula:

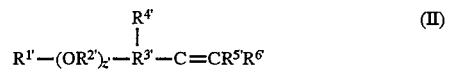

wherein:

$R^{1'}$ is a monovalent residue of a substituted or unsubstituted hydrophobe compound other than a complex hydrophobe compound;

each $R^{2'}$ is the same or different and is a substituted or unsubstituted divalent hydrocarbon residue;

$R^{3'}$ is a substituted or unsubstituted divalent hydrocarbon residue;

$R^{4'}$, $R^{5'}$ and $R^{6'}$ are the same or different and are hydrogen or a substituted or unsubstituted monovalent hydrocarbon residue; and z' is a value of 0 or greater.

The macromonomers useful in this invention can be represented by the formulae (I) and (II) above. The macromonomer compounds useful in this invention can be prepared by a number of processes, such as described in U.S. Pat. Nos. 5,292,843, 5,292,828 and U.S. Pat. No. Reissue 33,156, all incorporated herein by reference.

Illustrative substituted and unsubstituted divalent hydrocarbon residues represented by $R^2$ in formula (I) and $R^{2'}$ in formula (II) above include those described for the same type of substituents in formulae (III) and (IV) below. Illustrative substituted and unsubstituted monovalent hydrocarbon residues represented by $R^4$, $R^5$ and $R^6$ in formula (I) and by $R^{4'}$, $R^{5'}$ and $R^{6'}$ in formula (II) above include those described for the same type of substituents in formulae (III) and (IV) below.

Illustrative substituents represented by $R^3$ in formula (I) and $R^{3'}$ in formula (II) above include, for example, the organic residue of ethers, esters, urethanes, amides, ureas, urethanes, anhydrides and the like including mixtures thereof. The substituents represented by $R^3$ in formula (I) and $R^{3'}$ in formula (II) above can be generally described as a "linkage" between the complex hydrophobe bearing surfactant or alcohol, and the unsaturation portion of the macromonomer compound. Preferred linkages include the following: urethane linkages from the reaction of an isocyanate with a nonionic surfactant; urea linkages from the reaction of an isocyanate with an amine bearing surfactant; unsaturated esters of surfactants such as the esterification product of a surfactant with of an unsaturated carboxylic acid or an unsaturated anhydride; unsaturated esters of alcohols; esters of ethyl acrylate oligomers, acrylic acid oligomers, and allyl containing oligomers; half esters of surfactants such as those made by the reaction of a surfactant with maleic anhydride; unsaturated ethers prepared by reacting vinyl benzyl chloride and a surfactant or by reacting an allyl glycidyl ether with a surfactant, alcohol, or carboxylic acid.

The oxyalkylene moieties included in the macromonomer compounds of formulae (I) and (II) may be homopolymers or block or random copolymers of straight or branched alkylene oxides. Mixtures of alkylene oxides such as ethylene oxide and propylene oxide may be employed. It is understood that each $R^2$ group in formula (I) or $R^{2'}$ group in formula (II) in a particular substituent for all positive values of z and z' can be the same or different.

Illustrative monovalent residues of substituted and unsubstituted complex hydrophobe compounds represented by $R^1$ in formula (I) include, for example, those derived from substituted and unsubstituted complex hydrophobe compounds represented by the formula:

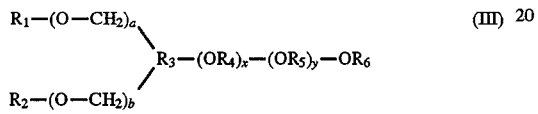 (III)

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$.

Other monovalent residues of substituted and unsubstituted complex hydrophobe compounds represented by $R^1$ in formula (I) include, for example, those derived from substituted and unsubstituted complex hydrophobe compounds represented by the formula:

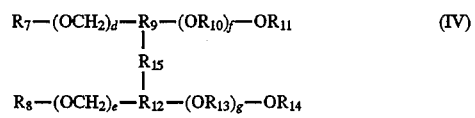 (IV)

wherein $R_7$ and $R_8$ are the same or different and are hydrogen or a substituted or unsubstituted monovalent hydrocarbon residue, $R_{11}$ and $R_{14}$ are the same or different and are hydrogen, a substituted or unsubstituted monovalent hydrocarbon residue or an ionic substituent, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ and $R_{14}$ or having greater than 2 pendant carbon atoms in the case of $R_9$, $R_{10}$, $R_{12}$, $R_{13}$ and $R_{15}$.

Such monovalent residues of substituted and unsubstituted complex hydrophobe compounds represented by formulae (III) and (IV) and processes for the preparation of complex hydrophobes are described in U.S. Pat. Nos. 5,292,843 and 5,292,828.

Illustrative monovalent residues of substituted and unsubstituted hydrophobe compounds represented by $R^{1'}$ in formula (II) include, for example, alkyl radicals including linear or branched primary, secondary or tertiary alkyl radicals, such as methyl, ethyl, n-propyl, isopropyl, amyl, sec-amyl, t-amyl, 2-ethylhexyl and the like; aryl radicals such as phenyl, naphthyl and the like; arylalkyl radicals such as benzyl, phenylethyl, tri-phenylmethylethane and the like; alkylaryl radicals such as octylphenyl, nonylphenyl, dodecylphenyl, tolyl, xylyl and the like; and cycloalkyl radicals such as cyclopentyl, cyclohexyl, cyclohexylethyl and the like.

Preferred macromonomer compounds useful in this invention include those represented by the formula:

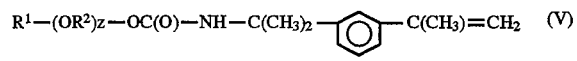 (V)

wherein $R^1$, $R^2$ and z are as defined herein. Other preferred macromonomer compounds useful in this invention include those represented by formula (V) in which $R^1$ is $R^{1'}$, $R^2$ is $R^{2'}$ and z is z'.

The polymers of this invention may further be modified by introducing an amount of component (E), namely, one or more polyethylenically unsaturated copolymerizable monomers effective for crosslinking, such as diallylphthalate, divinylbenzene, allyl methacrylate, trimethylol propane triacrylate, ethyleneglycol diacrylate or dimethacrylate, 1,6-hexanediol diacrylate or dimethylacrylate, diallyl benzene, and the like. Thus, from about 0.05 or less to about 20% or greater of such polyethylenically unsaturated compound based on total weight of monomer may be included in the composition forming the polymer. The resulting polymers are either highly branched or in the form of three-dimensional networks. In the neutralized salt form, those networks swell in an aqueous system to act as a highly efficient thickener.

Other illustrative polyethylenically unsaturated monomers useful in this invention include, for example, any copolymerizable compound which contains two or more nonconjugated points of ethylenic unsaturation or two or more nonconjugated vinylidene groups of the structure, $CH_2=C=$, such as divinyltoluene, trivinylbenzene, divinylnaphthalene, trimethylene glycol diacrylate or dimethacrylate, 2-ethylhexane-1,3-dimethyacrylate, divinylxylene, divinylethylbenzene, divinyl ether, divinyl sulfone, allyl ethers of polyhdric compounds such as of glycerol, pentaerythritol, sorbitol, sucrose and resorcinol, divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, diallyl tartrate, diallyl silicate, triallyl tricarballylate, triallyl aconitate, triallyl citrate, triallyl phosphate, N,N-methylenediacrylamide, N,N'-methylenedimethacrylamide, N,N'-ethylidenediacrylamide and 1,2-di-(a-methylmethylenesulfonamide)-ethylene.

The polymers of this invention also may include an amount of component (F), namely one or more acrylates and/or methacrylates derived from a strong acid or a salt of a strong acid. As used herein, "strong acid(s)" shall mean those acids substantially dissociated at a pH of 2 and shall include, for example, sulfonic acid and the like. Illustrative acrylates and methacrylates derived from a strong acid or a salt of a strong acid include, for example, 2-sulfoethyl methacrylate, 3-sulfopropyl methacrylate, 3-sulfopropyl acrylate, and the like. Other acrylates and methacrylates derived from a strong acid or a salt of a strong acid include those disclosed in U.S. Pat. No. 3,024,221. Suitable salts include, for example, the sodium, potassium, ammonium, etc., salt of the strong acid. The acrylates and methacrylates derived from a strong acid or a salt of a strong acid are employed in the emulsion polymerization process in an amount sufficient to reduce plating and/or grit formation during said process, preferably from about 0.1 to about 25 weight percent, more preferably from about 0.1 to about 10 weight percent, and most preferably from about 0.1 to about 2.0 weight percent.

The use of acrylates and/or methacrylates derived from a strong acid or a salt of a strong acid in a process for preparing an aqueous polymer emulsion useful as a dispersing or thickening agent in aqueous compositions significantly reduces both waste polymer ("scrap") in the form of reactor residue ("plating") and the formation of large particle size suspended aggregates ("grit") in the aqueous polymer emulsion products. Such plating and grit can jeopardize the commercial and economic viability of a process or product. Illustrative acrylates and/or methacrylates derived from a strong acid or a salt of a strong acid useful in this invention and processes for preparation thereof are disclosed in copending U.S. Pat. No. 5,399,618, which is incorporated herein by reference.

Factors that influence the performance of the dispersants and thickeners of this invention include chemical composition (the concentration of carboxyl, sulphonic, or phosphate moieties, hydrophobicity and glass transition temperature of the polymer through the use of comohomers, such as acrylates, methacrylates, styrene, isobutylene, vinyl esters, and acrylamide), molecular weight and polydispersity, the choice of neutralizing agent (i.e., the dispersants' counter-ion), and dosage. Optionally, the dispersants and thickeners can be further modified through the use of monomers or post treatments or reactions to facilitate latent cross-linking, air-cure, ambient cure, or thermosetting properties.

Although any effective amount of the polymeric dispersant and thickener may be employed for dissolution, typically from about 0.01 to about 20%, preferably from about 0.01 to about 5%, and most preferably from about 0.1 to about 3% by weight, based on the weight of the final aqueous composition including dispersant and thickener is used. For latex paint compositions, the dispersant or thickener may be dissolved therein in an amount of from about 0.01 to about 5%, and preferably from about 0.1 to about 3% by weight, based on the weight of the total composition including polymeric dispersant and thickener.

The particles of the composition of this invention can be organic or inorganic or hydrophilic or hydrophobic. This invention is particularly useful for dispersing titanium dioxide in a latex paint composition. However, it is appreciated that the dispersants of this invention also have applicability for dispersing other normally charged particles, such as precipitated and ground calcium carbonate, silica, aluminum hydrate, kaolin clay, composite pigments, gypsum, synthetic organic pigments which have anionic components on their surface, e.g., polystyrene spheres, colorants, and mixture of the above. This invention is not intended to be limited in any manner by permissible particles which may be dispersed using the dispersants of this invention.

The polymers of this invention can be prepared via a variety of polymerization techniques known to those skilled in the art, provided such polymerization techniques impart (i) colloidal stabilization to the polymer particles and (ii) a medium wherein electrostatic interaction of the polymer particles can take place. The technique of polymerization influences the microstructure, monomer sequence distribution in the polymer backbone and its molecular weight to influence the performance of the polymer. Illustrative polymerization techniques include, for example, conventional and staged aqueous emulsion polymerization via batch, semi-continuous, or continuous processes, miniemulsion and microemulsion polymerization, aqueous dispersion polymerization, interfacial polymerization, aqueous suspension polymerization, and the like.

For purposes of this invention, the terms "aqueous emulsion", "aqueous emulsion polymerization", and like terms, are contemplated to include all those polymerizations which provide (i) colloidal stabilization of the polymer particles and (ii) a medium wherein electrostatic interaction of the polymer particles can take place. As used herein, the term "aqueous polymer emulsions", and like terms, are contemplated to include all those polymer products prepared by aqueous emulsion or aqueous emulsion polymerization.

The polymerization system may contain amounts (0.01 to 5% by weight, based on monomer weight) of the chain transfer agent mercaptans such as hydroxyethyl mercaptan, β-mercaptopropionic acid and alkyl mercaptans containing from about 4 to 22 carbon atoms, e.g., ethyl hexyl mercapto propionate and tertiary dodecyl mercaptan, and the like. The use of mercaptan modifier reduces the molecular weight of the polymeric dispersant and therefore improves its dispersing efficiency.

In an embodiment of this invention, the emulsion polymerization is carried out in the presence of one or more buffers. Illustrative buffers useful in this invention include, for example, sodium acetate, sodium bicarbonate, potassium carbonate and the like. The buffers are employed in the emulsion polymerization process in an amount sufficient to reduce plating and/or grit formation during said process, preferably from about 0.01 to about 1.0 weight percent, more preferably from about 0.1 to about 0.5 weight percent.

The order of addition of the dispersant in the pigment dispersion process is important to put the most suitable dispersant on the pigment first to promote color development when the stabilized pigment is subsequently used in the paint system.

The thickeners of this invention possess structural attributes of two entirely different types of thickeners (those which thicken by pH dependent solubilization, e.g., alkali solubilization, of a high molecular weight entity, and those which thicken due to association), and this may account for the superior thickener properties which are obtained herein.

An enhancement of thickening (herein termed "co-thickening") can result upon the addition of a surfactant to an aqueous system containing the thickener of this invention, when the thickener is solubilized. Such co-thickening is described, for example, in U.S. Pat. Nos. 5,292,843 and 5,292,828. An enhancement of dispersing (herein termed "co-dispersing") may result upon the addition of a surfactant to an aqueous system containing the dispersant of this invention, when the dispersant is solubilized.

In general, solvents and non-solvents (or mixtures of solvents, non-solvents other organics and volatiles) may be used to manipulate the viscosity or dispersibility of polymer containing systems. The co-thickening or co-dispersing with mineral spirits has utility in textile printing pastes, and in waterborne automotive basecoats. These systems usually contain mineral spirits (because of the pigments used therein), so that the mineral spirits provide an economical way of increasing viscosity or dispersibility and improving the efficiency of the thickener or dispersant.

The dispersants and thickeners described herein are useful in a variety of aqueous systems, such as textile coatings (woven and nonwoven), latex paint formulations, cosmetic formulations, pigment dispersions and slurries, dentifrices, hand lotions, liquid detergents, quenchants, agricultural chemicals, concrete additives, transmission fluids, waste water treatment (flocculants), turbulent drag reduction, aircraft anti-icing, automation coatings (OEM and refinish), architectural coatings, industrial coatings, caulks, adhesives and the like. Other applications include, for example, paper coating, paper making, mineral processing, brine viscosification, superabsorbency, enhanced oil recovery, personal care products, biomedical, pharmaceutical and the like.

Preferably, the polymeric dispersant is used to disperse and the polymeric thickener is used to thicken aqueous coating compositions, and more preferably latex paint compositions. Examples of suitable latex paint compositions include those based on resins or binders of acrylonitrile, copolymers of acrylonitrile wherein the comonomer is a diene like isoprene, butadiene or chloroprene, homopolymers and copolymers of styrene, homopolymers and copolymers of vinyl halide resins such as vinyl chloride, vinylidene chloride or vinyl esters such as vinyl acetate, vinyl acetate homopolymers and copolymers, copolymers of styrene and unsaturated acid anhydrides like maleic anhydrides, homopolymers and copolymers of acrylic and methacrylic acid and their esters and derivatives, polybutadiene, polyisoprene, butyl rubber, natural rubber, ethylene-propylene copolymers, olefins resins like polyethylene and polypropylene, polyvinyl alcohol, carboxylated natural and synthetic latices, epoxies, epoxy esters and similar polymeric latex materials.

Latex paint compositions are well known in the art and typically comprise an emulsion, dispersion or suspension of discrete particles of resin binder and pigment in water. Optional ingredients typically include thickeners, antifoam agents, plasticizers, surfactants, coalescing agents, and the like. Associative dispersants may be used to advantage with associative thickeners in coating formulations as described below.

The coating compositions can comprise cross-linking materials, pigments not capable of being associatively dispersed, dyes, optical brighteners and other dispersants. The coating compositions of this invention can also comprise biocides, bacteriocides, and defoamers, all conventionally employed in coating compositions. The usual additives are added in conventional amounts to obtain desired formulation properties.

Mixtures of dispersants and/or thickeners may also be useful in this invention. For example, a polymeric dispersant of this invention may advantageously be used in combination with one or more other polymeric dispersants of this invention or one or more other polymeric dispersants, e.g., a polymeric dispersant containing only a macromonomer as described in U.S. Pat. Nos. 5,292,843, 5,292,828 or Reissue Pat No.33,156. Likewise, a polymeric thickener of this invention may advantageously be used in combination with one or more other polymeric thickeners of this invention or one or more other polymeric thickeners, e.g., a polymeric thickener containing only a macromonomer as described in U.S. Pat. Nos. 5,292,843, 5,292,828 or Reissue Pat. No. 33,156. By using such mixtures, paint properties may be optimized and improvements in the manufacturing process may be realized. This invention is not intended to be limited in any manner by the permissible mixtures of dispersants, thickeners or dispersants and thickeners.

The use of associative dispersants that contain complex hydrophobic groups that are similar to those used by associative thickeners allows the development of a "systems approach", wherein paint properties (hiding, color development, colorant compatibility, higher gloss, improved rheology, improved synerisis, improved viscosity stability) are optimized and improvements in the manufacturing process realized by using compatible associative hydrophobe technology in colorants, dispersants, pigment slurries, latexes, and thickeners in conventional, low, and zero VOC tint base and paint systems. Especially important to zero and low VOC colorants is the ability of the associative dispersant to provide improved pigment wetting, resistance to pigment settling, high solids pigment dispersion capability, and machine colorant dispersing (i.e., rheological properties). Mixtures of associative dispersants and associative thickeners are preferred mixtures of this invention.

As used herein, the term "complex hydrophobe" is contemplated to include all permissible hydrocarbon compounds having 2 or more hydrophobe groups, e.g., bis-dodecylphenyl, bis-nonylphenyl, bis-octylphenyl and the like.

For purposes of this invention, the term "hydrocarbon" is contemplated to include all permissible compounds having at least one hydrogen and one carbon atom. In a broad aspect, the permissible hydrocarbons include acyclic and cyclic, branched and unbranched, carbocyclic and heterocyclic, aromatic and nonaromatic organic compounds which can be substituted or unsubstituted.

As used herein, the term "substituted" is contemplated to include all permissible substituents of organic compounds unless otherwise indicated. In a broad aspect, the permissible substituents include acyclic and cyclic, branched and unbranched, carbocyclic and heterocyclic, aromatic and nonaromatic substituents of organic compounds. Illustrative substituents include, for example, alkyl, alkyloxy, aryl, aryloxy, hydroxy, hydroxyalkyl, amino, aminoalkyl, halogen and the like in which the number of carbons can range from 1 to about 20 or more, preferably from 1 to about 12. The permissible substituents can be one or more and the same or different for appropriate organic compounds. This invention is not intended to be limited in any manner by the permissible substituents of organic compounds.

The invention is illustrated by certain of the following examples.

EXAMPLE 1

Preparation of 1,3-Bis(nonylphenoxy)-2-propanol

To a five neck, two liter round bottom flask equipped with an addition funnel, thermometer, nitrogen dispersant tube, mechanical stirrer, and a decanting head with a water-cooled condenser were added 220 grams (1.00 mole) of nonylphenol and 250 milliliters of cyclohexane. The solution was then heated to reflux and 2.8 grams (1.3 wt. % based on nonylphenol) of potassium hydroxide in 10 milliliters of water was slowly added to the flask. After essentially all the water was recovered in the decanting head (10 milliliters + 1 milliliter formed), 250.7 grams (0.91 mole) of nonylphenyl glycidyl ether as added dropwise. During the addition of the glycidyl ether, the reaction temperature was maintained between 60° and 80° C. After the addition was complete, the solution was refluxed for four hours. The contents of the flask were then washed with a five percent aqueous solution of phosphoric acid, and the organic layer was separated from the water layer and washed twice with deionized water. The reaction mixture was then placed in a one liter round bottom flask, and the remaining cyclohexane and unreacted nonylphenol were recovered by distillation, first at atmospheric pressure, then under vacuum at 0.2 mm Hg. The kettle temperature was not allowed to exceed 180° C. during the distillation to prevent discoloration of the product. The concentrated solution was then refiltered to give 425 grams of a pale-yellow liquid. End-group MW analysis gave a molecular weight of 506.8 (theoretical MW=496.8). Ir and nmr spectra were identical to previously recorded spectra for the compound.

EXAMPLE 2

Preparation of 5 Mole Ethoxylate of 1,3-Bis (nonylphenoxy)-2-propanol

To a 500 milliliter, stainless steel, high pressure autoclave was charged 200 grams (0.40 mole) of 1,3-bis (nonylphenoxy)-2-propanol, which contained a catalytic amount of the potassium salt of the alcohol as described in Example 1. After purging the reactor with nitrogen, the alcohol was heated to 130° C. with stirring, and 86.9 grams (2.0 mole) of ethylene oxide was added over a two hour period. The reaction temperature and pressure were maintained from 130° C. to 140° C. and 60 psig during the course of the reaction. After the addition of ethylene oxide was complete, the reaction mixture was held at 140° C. for an additional hour to allow all the ethylene oxide to cook out. The reaction mixture was dumped while hot, under nitrogen, and neutralized with acetic acid to yield 285 grams of a pale-yellow liquid.

In a manner similar to that described in Example 2 and also in U.S. Pat. Nos. 5,292,843 and 5,292,828, other surfactants were prepared and are identified in Table A below.

TABLE A $$R_1-O-CH_2$$
$$|$$
$$CH-(OCH_2CH_2)_xOCH_2CH_2OH$$
$$|$$
$$R_2$$

| Surfactant Designation | $R_1$ | $R_2/R_3$ | Moles of Ethoxylation |
|---|---|---|---|
| S-1 | Nonylphenyl | Hydrogen ($R_2$) | 40 |
| S-2 | Nonylphenyl | Nonylphenyl ($R_3$) | 40 |
| S-3 | Nonylphenyl | Nonylphenyl ($R_3$) | 20 |
| S-4 | Nonylphenyl | Octylphenyl ($R_3$) | 20 |
| S-5 | Nonylphenyl | Octylphenyl ($R_3$) | 40 |
| S-6 | Nonylphenyl | Nonylphenyl ($R_3$) | 80 |
| S-7 | Nonylphenyl | Nonylphenyl ($R_3$) | 120 |
| S-8 | Nonylphenyl | Nonylphenyl ($R_3$) | 6 |
| S-9 | Nonylphenyl | Nonylphenyl ($R_3$) | 12 |
| S-10 | n-Decyl | Hydrogen ($R_2$) | 40 |
| S-11 | n-Dodecyl | Hydrogen ($R_2$) | 40 |
| S-12 | n-Hexadecyl | Hydrogen ($R_2$) | 40 |
| S-13 | n-Octadecyl | Hydrogen ($R_2$) | 40 |
| S-14 | 1-Eicosanyl | Hydrogen ($R_2$) | 40 |
| S-15 | Methyl | Hydrogen ($R_2$) | 44 |
| S-16 | Methyl | Hydrogen ($R_2$) | 113 |
| S-17 | Octylphenyl | Hydrogen ($R_2$) | 40 |
| S-18 | Dodecylphenyl | Hydrogen ($R_2$) | 40 |
| S-19 | Dinonylphenyl | Hydrogen ($R_2$) | 40 |
| S-20 | Nonylphenyl | Hydrogen ($R_2$) | 70 |
| S-21 | Nonylphenyl | Hydrogen ($R_2$) | 50 |

$R_2$ = hydrogen or a $R_3-O-CH_2-$ residue.

EXAMPLE 3

Macromonomer Preparation

To a 3 liter round bottom flask equipped with an overhead stirrer, nitrogen inlet and sparging tube, water cooled reflux condenser, monomer addition tube, FMI pump and feed tank, and heating mantel and temperature controller, 2000 grams of previously melted surfactant S-2 were charged. The materials were heated to 85° C. under nitrogen sparge and mixing, and held at temperature for 1 hour to drive off residual water. Then 0.05 grams of 4-methoxyphenol were added, and the mixture was sparged with air for 15 minutes to activate the inhibitor. 2.4 grams of dibutyl tin dilaurate were added, and after 15 minutes of mixing, 201.25 grams of alpha, alpha-dimethyl-m-isopropenyl benzyl isocyanate (m-TMI) were fed over 45 minutes. The mixture was held at 85° C. for another 4 hours. Then 243 grams of water was pumped into the reaction mixture over a 25 minute period to wash the feed lines of isocyanate, and to dilute the product macromonomer to 90% solids. The product macromonomer was cooled and collected in a 1 gallon jug.

In a manner similar to that described in Example 3 and also in U.S. Pat. Nos. 5,292,843 and 5,292,828, other macromonomers were prepared using stoichiometric amounts of the surfactants and unsaturated compounds identified in Table B below.

TABLE B

| Surfactant Designation | Unsaturated Compound | Macromonomer Designation |
|---|---|---|
| S-1 | m-TMI | M-1 |
| S-2 | m-TMI | M-2 |
| S-3 | m-TMI | M-3 |
| S-4 | m-TMI | M-4 |
| S-5 | m-TMI | M-5 |
| S-6 | m-TMI | M-6 |
| S-7 | m-TMI | M-7 |
| S-2 | Isocyanato Ethyl Methacrylate | M-8 |
| S-5 | Isocyanato Ethyl Methacrylate | M-9 |
| S-1 | Methacrylic Anhydride | M-10 |
| S-2 | Methacrylic Anhydride | M-11 |
| S-5 | Methacrylic Anhydride | M-12 |
| S-6 | Methacrylic Anhydride | M-13 |
| S-2 | Acrylic Anhydride | M-14 |
| S-5 | Acrylic Anhydride | M-15 |
| S-6 | Acrylic Anhydride | M-16 |
| S-2 | Crotonic Anhydride | M-17 |
| S-5 | Maleic Anhydride | M-18 |
| S-2 | Methacryloyl Isocyanate | M-19 |
| S-6 | Methacryloyl Isocyanate | M-20 |
| S-8 | m-TMI | M-21 |
| S-9 | m-TMI | M-22 |
| S-10 | m-TMI | M-23 |
| S-11 | m-TMI | M-24 |
| S-12 | m-TMI | M-25 |
| S-13 | m-TMI | M-26 |
| S-14 | m-TMI | M-27 |
| S-15 | m-TMI | M-28 |
| S-16 | m-TMI | M-29 |
| S-17 | m-TMI | M-30 |
| S-18 | m-TMI | M-31 |
| S-19 | m-TMI | M-32 |
| S-20 | m-TMI | M-33 |
| S-21 | m-TMI | M-34 |
| Silwet L-7614* | m-TMI | M-35 |

*Silwet L-7614 is an ethoxylated silicone surfactant available from OSi Specialties, Inc.

EXAMPLE 4

Preparation Of An Alkali-Soluble Thickener

A monomer mixture was prepared by charging 120 grams of ethyl acrylate (Aldrich), 120 grams of methacrylic acid (Aldrich), 13 grams of a 75% solution of Aerosol® OT surfactant (American Cyanamid), 45 grams of macromonomer M-6, 15 grams of macromonomer M-1, and 30 grams of distilled deionized water to a bottle, and mixing the contents with vigorous shaking. To a two liter jacketed resin flask equipped with a four-bladed stainless steel mechanical stirrer, Claisen connecting tube, Friedrichs water condenser, nitrogen sparge and bubble trap, thermometer, and monomer addition inlets 846 grams of water and 2.7 grams of a 75% solution of Aerosol® OT surfactant were added. Under nitrogen purge, the reaction was heated to 80° C. by circulating temperature controlled water through the reactor jacket. 0.26 grams of sodium persulfate initiator (Aldrich) previously dissolved in 2.3 grams of water, and 35 grams of the monomer mixture were added to the reactor. The remainder of the monomer mixture was charged to a one-liter graduated monomer feed cylinder. In a separate vessel, 0.51 grams of sodium persulfate was dissolved in 50 grams of water. After allowing the initial monomer charge to react for 35 minutes to form a seed latex, the remaining monomer feed mixture and the sodium persulfate solution were conveyed to the reaction vessel by FMI pumps via ⅛" Teflon tubing over a two and one-half hour period while the reaction mixture was continuously stirred at a reaction temperature held between 76°–82° C. The reaction was allowed to proceed for another quarter hour, after which 0.1 gram of tert-butyl hydroperoxide (Aldrich) previously dissolved in 1.4 grams of water and 0.1 grams of sodium formaldehyde sulfoxylate (Royce) previously dissolved in 4.6 grams of water were added to the latex to reduce residual monomer. The reaction was allowed to proceed for an additional 70 minutes. The thickening ability of the resulting product was monitored by Brookfield viscosity at 6 rpm by diluting the 25% solids latex to 0.25%, 0.50% and 0.75% solids, and subsequently neutralizing the product to pH=9.0 with a 95% solution of 2-amino-2-methyl-1-propanol (AMP-95, Angus Chemical Company). The results are given in Table C below. This thickener is designated as P-1 in Table C.

EXAMPLES 5–53

Preparation of Thickeners

In a manner similar to that described in Example 4, other polymers were prepared using the monomers identified in Table C in the amounts identified in Table C. Examples 4 through 6 illustrate the use of a mixture of hydrophobes in a thickener that imparts a rheology similar to that obtained with conventional cellulosic thickeners. Examples 7, 9 and 33 are illustrative of prior art thickeners that employ solely conventional hydrophobes. Example 8 is illustrative of thickeners employing complex hydrophobes. Examples 10 and 11 illustrate the use of a mixture of hydrophobes in a thickener that imparts a comparatively more Newtonian rheology to paints. Examples 12 through 15 illustrate the use of adducts of methacryloyl isocyanate. Examples 9 through 11 and 16 and 17 illustrate the use M-6 and M-2, respectively, and that a surprising small amount of complex hydrophobe in the hydrophobe mixture can dramatically influence rheology. Examples 18 through 20 illustrate the use of comohomers besides ethyl acrylate. The following examples illustrate the use of the following hydrophobes in macromonomer mixtures: examples 21 and 22—silicone hydrophobe in conjunction with a complex hydrophobe; examples 23 through 29—methyl hydrophobes in conjunction with a complex hydrophobe; examples 30 through 33—conventional dinonylphenyl hydrophobes in conjunction with nonylphenyl hydrophobes; examples 34 through 53—nonylphenyl hydrophobe in conjunction with complex hydrophobe and in combination with SEM and a chain transfer agent other than tDDM. As used in Table C, the following abbreviations have the indicated meanings: MM=Macromonomer; EA=Ethyl Acrylate; MAA= Methacrylic Acid; 2-EHMP=2-Ethylhexyl Mercapto Propionate; 2-SEM=2-sulfoethyl methacrylate; CTA=chain transfer agent; tDDM=tertiary dodecanethiol; BA=Butyl Acrylate.

TABLE C

| | Thickener Composition by Weight | | | | | | | Brookfield Viscosity | | | |
|---|---|---|---|---|---|---|---|---|---|---|---|
| | Macromonomers | | % MM | | | | | CTA* | (CPS) @ pH = 9.0 | | | Thickener |
| Example | #1 | #2 | #1 | #2 | % EA | % MAA | % Other | p.h.r. | 0.25% | 0.50% | 0.75% | Designation |
| 4 | M-1 | M-6 | 5 | 15 | 40 | 40 | 0 | 0 | 122 | 35,700 | 132,400 | P-1 |
| 5 | M-1 | M-6 | 10 | 10 | 40 | 40 | 0 | 0 | 107 | 19,100 | 70,300 | P-2 |
| 6 | M-1 | M-6 | 15 | 5 | 40 | 40 | 0 | 0 | 90 | 8,860 | 32,900 | P-3 |
| 7 | M-1 | M-6 | 20 | 0 | 40 | 40 | 0 | 0 | 65 | 355 | 1,275 | P-4 |
| 8 | M-1 | M-6 | 0 | 20 | 40 | 40 | 0 | 0 | 120 | 43,000 | 150,000 | P-5 |
| 9 | M-34 | M-6 | 15 | 0 | 50 | 35 | 0 | 0.2 (tDDM) | — | 12 | 46 | P-6 |
| 10 | M-34 | M-6 | 13 | 2 | 50 | 35 | 0 | 0.2 (tDDM) | — | 161 | 450 | P-7 |
| 11 | M-34 | M-6 | 10 | 5 | 50 | 35 | 0 | 0.2 (tDDM) | — | 1,760 | 10,260 | P-8 |
| 12 | M-1 | M-20 | 5 | 15 | 40 | 40 | 0 | 0 | 850 | 44,200 | 120,000 | P-9 |
| 13 | M-1 | M-20 | 10 | 10 | 40 | 40 | 0 | 0 | 455 | 25,700 | 59,000 | P-10 |
| 14 | M-1 | M-20 | 15 | 5 | 40 | 40 | 0 | 0 | 175 | 9,160 | 22,800 | P-11 |
| 15 | M-1 | M-20 | 10 | 10 | 40 | 40 | 0 | 0.1 (2EHMP) | 440 | 14,700 | 36,700 | P-12 |
| 16 | M-34 | M-2 | 13 | 2 | 50 | 35 | 0 | 0.2 (tDDM) | — | 151 | 800 | P-13 |
| 17 | M-34 | M-2 | 10 | 5 | 50 | 35 | 0 | 0.2 (tDDM) | — | 655 | 10,600 | P-14 |
| 18 | M-34 | M-2 | 13 | 2 | 40 | 35 | 10 (BA) | 0.2 (tDDM) | — | 33 | 247 | P-15 |
| 19 | M-34 | M-2 | 13 | 2 | 30 | 35 | 20 (BA) | 0.2 (tDDM) | — | 15 | 115 | P-16 |
| 20 | M-34 | M-2 | 13 | 2 | 20 | 35 | 30 (BA) | 0.2 (tDDM) | — | — | 34 | P-17 |
| 21 | M-35 | M-6 | 20 | 0 | 40 | 40 | 0 | 0 | 166 | 2,010 | 6,340 | P-18 |
| 22 | M-35 | M-6 | 18 | 2 | 40 | 40 | 0 | 0 | 250 | 6,860 | 19,000 | P-19 |
| 23 | M-29 | M-2 | 20 | 0 | 40 | 40 | 0 | 0 | 31 | 250 | 710 | P-20 |
| 24 | M-29 | M-2 | 19 | 1 | 40 | 40 | 0 | 0 | 28 | 313 | 7,100 | P-21 |
| 25 | M-29 | M-2 | 18 | 2 | 40 | 40 | 0 | 0 | 27 | 500 | 15,140 | P-22 |
| 26 | M-29 | M-2 | 15 | 5 | 40 | 40 | 0 | 0 | 17 | 620 | 17,500 | P-23 |
| 27 | M-29 | M-2 | 10 | 10 | 40 | 40 | 0 | 0 | 38 | 5,140 | 67,000 | P-24 |
| 28 | M-29 | M-2 | 5 | 10 | 45 | 40 | 0 | 0 | 64 | 6,440 | 68,000 | P-25 |
| 29 | M-29 | M-2 | 20 | 10 | 30 | 40 | 0 | 0 | 20 | 2,575 | 50,000 | P-26 |

TABLE C-continued

| | Macromonomers | | Thickener Composition by Weight | | | | | CTA* | Brookfield Viscosity (CPS) @ pH = 9.0 | | | Thickener |
| | | | % MM | | | | | | | | | |
| Example | #1 | #2 | #1 | #2 | % EA | % MAA | % Other | p.h.r. | 0.25% | 0.50% | 0.75% | Designation |
|---|---|---|---|---|---|---|---|---|---|---|---|---|
| 30 | M-32 | M-34 | 30 | 0 | 30 | 40 | 1 (SEM) | 0.3 (tDDM) | 25 | 50 | 125 | P-27 |
| 31 | M-32 | M-34 | 30 | 2 | 30 | 40 | 0.5 (SEM) | 0.3 (tDDM) | 10 | 30 | 90 | P-28 |
| 32 | M-32 | M-34 | 30 | 5 | 30 | 40 | 0.5 (SEM) | 0.3 (tDDM) | 4 | 7 | 37 | P-29 |
| 33 | M-32 | M-34 | 30 | 0 | 30 | 40 | 0 | 0 | — | — | — | P-30 |
| 34 | M-34 | M-6 | 0 | 10 | 50 | 40 | 1 (SEM) | 0.3 (2EHMP) | 10 | 10 | 15 | P-31 |
| 35 | M-34 | M-6 | 0 | 10 | 50 | 40 | 1 (SEM) | 0 | 1,000 | 12,500 | 14,500 | P-32 |
| 36 | M-34 | M-6 | 0 | 20 | 50 | 40 | 1 (SEM) | 0 | 20 | 9,000 | 28,500 | P-33 |
| 37 | M-34 | M-6 | 0 | 15 | 45 | 40 | 1 (SEM) | 0.15 (2EHMP) | 25 | 4,000 | 23,500 | P-34 |
| 38 | M-34 | M-6 | 0 | 20 | 40 | 40 | 1 (SEM) | 0.3 (3EHMP) | 50 | 2,000 | 7,000 | P-35 |
| 39 | M-34 | M-6 | 15 | 0 | 45 | 40 | 1 (SEM) | 0.15 (2EHMP) | 25 | 100 | 200 | P-36 |
| 40 | M-34 | M-6 | 20 | 0 | 40 | 40 | 1 (SEM) | 0 | 50 | 1,000 | 2,500 | P-37 |
| 41 | M-34 | M-6 | 10 | 0 | 50 | 40 | 1 (SEM) | 0 | 50 | 325 | 1,275 | P-38 |
| 42 | M-34 | M-6 | 20 | 0 | 40 | 40 | 1 (SEM) | 0.3 (2EHMP) | — | — | 5 | P-39 |
| 43 | M-34 | M-6 | 10 | 0 | 50 | 40 | 1 (SEM) | 0.3 (2EHMP) | — | — | 10 | P-40 |
| 44 | M-34 | M-6 | 10 | 10 | 40 | 40 | 1 (SEM) | 0.15 (2EHMP) | 175 | 11,000 | 21,000 | P-41 |
| 45 | M-34 | M-6 | 5 | 5 | 50 | 40 | 1 (SEM) | 0.15 (2EHMP) | — | 20 | 50 | P-42 |
| 46 | M-34 | M-6 | 7.5 | 7.5 | 45 | 40 | 1 (SEM) | 0.15 (2EHMP) | 10 | 175 | 625 | P-43 |
| 47 | M-34 | M-6 | 7.5 | 7.5 | 45 | 40 | 1 (SEM) | 0 | 1275 | 10,000 | 40,500 | P-44 |
| 48 | M-34 | M-6 | 9.4 | 3.1 | 47.5 | 40 | 1 (SEM) | 0.1 (2EHMP) | 50 | 425 | 1175 | P-45 |
| 49 | M-34 | M-6 | 13.1 | 4.4 | 42.5 | 40 | 1 (SEM) | 0.1 (2EHMP) | 450 | 2,725 | 8,500 | P-46 |
| 50 | M-34 | M-6 | 7.5 | 7.5 | 45 | 40 | 1 (SEM) | 0.3 (2EHMP) | 30 | 1,200 | 11,500 | P-47 |
| 51 | M-34 | M-6 | 4.4 | 13.1 | 42.5 | 40 | 1 (SEM) | 0.2 (2EHMP) | 10 | 50 | 150 | P-48 |
| 52 | M-34 | M-6 | 0 | 12.5 | 47.5 | 40 | 1 (SEM) | 0.1 (2EHMP) | 400 | 13,500 | 44,500 | P-49 |
| 53 | M-34 | M-6 | 7.7 | 7.5 | 45 | 40 | 1 (SEM) | 0.05 (2EHMP) | 300 | 12,700 | 32,500 | P-50 |

*CTA = Chain Transfer Agent used, part per hundred parts of resin.

EXAMPLES 54 THROUGH 71

Colorant Compatibility and Stability of Vinyl Acrylic Paints

A vinyl acrylic semi-gloss paint (Example 54 in Table D below) was prepared by mixing the following ingredients in sequence: 91 grams of water, 2 grams of Tamol® 1124 (Rohm and Haas), 2 grams of Triton® N-101 (Union Carbide Corp.), 20 grams of Omyacarb® UF (Omya Inc.), 275 grams of TiPure® R-942 (DuPont), 2 grams (a first portion) of Drewplus® L-475 (Ashland), 441 grams of UCAR® Latex 367 (Union Carbide Corp.), 17 grams of UCAR® Filmer IBT (Union Carbide Corp.), 4 grams of AMP-95® (Angus), 2 grams of Nuosept® 95 (Huls), 1 gram of Triton® GR-5M (Union Carbide Corp.), 4 grams (a second portion) of Drewplus® L-475, and 11.91 grams of thickener P-6. Other paints identified in Table D were prepared in a similar manner. In particular, one thickener selected from the group of thickeners that imparted a rheology similar to a conventional cellulosic thickener (i.e., P-1, P-2, P-3, P-4, P-5, P-30) and one thickener selected from the group of thickeners that imparted a more Newtonian rheology (i.e., P-6, P-7, P-8) were used in combination in the paint to provide the appropriate balance of low, middle, and high shear rate viscosities. The amount and type of thickener solids in the solution, identified in Table D, were selected to produce a paint with a Stormer viscosity of 91 KU after an equilibration time of one day. After equilibration, the rheological properties recorded in Table D (0.3 RPM Brookfield Viscosity, Stormer Viscosity, ICI Viscosity) were measured.

To determine colorant float (i.e., in-can separation) and flocculation, 12.5 grams of black colorant (Huls) were added under agitation to 256 grams of equilibrated paint, and the paints were aged 1 week. Colorant float was determined by visually inspecting the degree of separation as manifested by an oily layer containing a high concentration of colorant, appearing richer in color than the rest of the paint. The subjective rating ranges from no separation (None) though very slight (VSL), slight (SL), moderate (MOD), poor (POOR), and severe (SEV). Colorant flocculation was determined by drawing down a 3 mil paint film on a Leneta 3B chart. After allowing the film to dry overnight, a small amount of paint was applied with the tip of a finger on the dry film and rubbed in a circular motion until dry. Rubbing the paint in this way applies shear to the paint as it dried to prevents the pigment from flocculating, and indicates the true color of the paint with well dispersed pigment. Comparing the color of the rubbed-up spot to the rest of the film reveals colorant flocculation. If the colorant has flocculated, the paint film has less color than the rubbed-up spot. If the titanium dioxide has flocculated, the paint film has more color than the rubbed-up spot. The degree of flocculation was rated subjectively from none (None) though very slight (VSL), slight (SL), moderate (MOD), poor (POOR), and severe (SEV).

Paint examples 54, 55 and 56 were thickened with polymers representing the prior art. Although it is possible to achieve either color acceptance or stability against in-can float individually, the prior art thickeners employing conventional hydrophobes do not impart stability against pigment flocculation or against in-can colorant float simultaneously. Use of the prior art thickeners in combination to achieve the desired rheological properties exasperates the color flocculation and color float problems (see example 56).

But a thickener employing a complex hydrophobe (but not a mixture of hydrophobes) produces better color acceptance and in-can float when used in combination with a thickener employing conventional hydrophobes (but not a mixture of hydrophobes) (see example 57).

However, even better color acceptance and stability against in-can colorant float can be achieved when each thickener employs a mixture of hydrophobes, especially when the hydrophobe mixture contain a complex hydrophobe (see examples 62 and 64).

The amount of thickener blend and the ratio of thickeners used in the blend is approximately constant for the examples 57 through 71. Even though all of the paints required about the same amount of thickener blend to achieve the required Stormer viscosity, the low shear and high shear viscosities varied from 400 to 2000 Poise, and 0.9 to 1.7 Poise, respectively, for a 2×change in ICI viscosity, and a 5×change in low shear viscosity. Thus, the use of a mixture of hydrophobes in a given thickener permits manipulation of low and high shear viscosities independent of the molecular weight of the polymer, and therefore allows manipulation of rheology without harming color acceptance, as desired.

The examples in Table D show that the selection of composition of the hydrophobes in the hydrophobe mixture employed by the thickener, as well as the selection of the thickeners to be used in combination to thicken the latex paint are important, and that the improved stability against in-can float and colorant and pigment flocculation are fundamentally related to the physical chemistry of hydrophobic interactions.

TABLE D

| Example # | 54 | 55 | 56 | 57 | 58 | 59 | 60 | 61 | 62 |
|---|---|---|---|---|---|---|---|---|---|
| Thickener | P-6 | | P-6 | P-6 | P-7 | P-8 | P-6 | P-7 | P-8 |
| Amount (grams) | 11.91 | | 5.62 | 2.91 | 2.82 | 2.62 | 2.98 | 2.84 | 2.75 |
| Thickener | | P-30 | P-30 | P-5 | P-5 | P-5 | P-1 | P-1 | P-1 |
| Amount (Grams) | | 4.59 | 2.65 | 2.87 | 2.78 | 2.57 | 3.04 | 2.81 | 2.75 |
| Viscosity 0.3 RPM (Poise) | 396 | 1236 | 784 | 2128 | 2092 | 1940 | 1776 | 1736 | 1776 |
| Viscosity 60 RPM (Poise) | 21 | 38 | 31 | 34 | 38 | 38 | 34 | 34 | 42 |
| ICI Viscosity (Poise) | 3.05 | 1.10 | 2.10 | 1.10 | 1.00 | 0.90 | 1.20 | 1.20 | 0.95 |
| Stormer Viscosity (KU) | 90 | 91 | 97 | 91 | 91 | 90 | 91 | 89 | 91 |
| Color Flocculation: | | | | | | | | | |
| 1 Day | VSL | MOD | MOD | SL–MOD | VSL–SL | VSL | MOD | SL | SL |
| 1 Week | VSL | MOD | MOD | SL–MOD | SL | VSL–SL | SL–MOD | MOD | SL |
| 2 Weeks | SL | MOD | MOD–POOR | MOD | SL–MOD | SL | MOD | MOD | SL |
| 4 Weeks | VSL | MOD | POOR | MOD | SL–MOD | VSL–SL | MOD | MOD | SL |
| In-Can Float: | | | | | | | | | |
| 1 Day | POOR | SL | MOD | VSL | SL | SL | SL | SL | SL |
| 1 Week | POOR | SL | MOD | SL | VSL | SL | SL | SL | SL |
| 2 Weeks | MOD | SL | SL | SL | SL | SL | SL | SL | SL |
| 4 Weeks | POOR | SL–MOD | POOR | SL | MOD | MOD | SL | SL | SL |

| Example # | 63 | 64 | 65 | 66 | 67 | 68 | 69 | 70 | 71 |
|---|---|---|---|---|---|---|---|---|---|
| Thickener | P-6 | P-7 | P-8 | P-6 | P-7 | P-8 | P-6 | P-7 | P-8 |
| Amount (grams) | 3.18 | 3.18 | 2.81 | 3.21 | 3.12 | 2.86 | 3.26 | 3.28 | 2.94 |
| Thickener | P-2 | P-2 | P-2 | P-3 | P-3 | P-3 | P-4 | P-4 | P-4 |
| Amount (Grams) | 3.32 | 3.18 | 2.99 | 3.23 | 3.09 | 2.83 | 3.34 | 3.40 | 2.85 |
| Viscosity 0.3 RPM (Poise) | 1352 | 1368 | 1416 | 856 | 896 | 936 | 140 | 484 | 740 |
| Viscosity 60 RPM (Poise) | 35 | 39 | 41 | 32 | 35 | 33 | 26 | 28 | 35 |
| ICI Viscosity (Poise) | 1.40 | 1.30 | 1.05 | 1.70 | 1.30 | 1.15 | 1.70 | 1.45 | 1.15 |
| Stormer Viscosity (KU) | 91 | 91 | 91 | 91 | 91 | 90 | 90 | 90 | 90 |
| Color Flocculation: | | | | | | | | | |
| 1 Day | SL | SL | SL | SL | SL–MOD | SL | SL | SL | MOD |
| 1 Week | SL–MOD | SL | SL–MOD | SL–MOD | MOD | SL–MOD | SL | MOD | MOD |
| 2 Weeks | MOD | SL | MOD | MOD | MOD | MOD | SL–MOD | MOD | MOD |
| 4 Weeks | SL–MOD | SL | SL–MOD | SL–MOD | MOD | SL–MOD | SL–MOD | SL | MOD |
| In-Can Float: | | | | | | | | | |
| 1 Day | SL | SL | SL | SL | SL | SL | SL | SL | SL |
| 1 Week | SL | SL | SL | SL | SL | SL | SL | SL | SL |
| 2 Weeks | SL | SL | SL | SL | SL | SL | SL | SL | SL |
| 4 Weeks | MOD | SL | MOD | MOD | MOD | MOD | MOD | MOD | MOD |

EXAMPLE 72

Preparation of Dispersant

In a manner similar to that described in Example 4, a polymeric dispersant was prepared using the monomers identified in Table E below in the amounts identified in Table E. The %AM, %MAA and %EA columns of Table E refer to % by weight of AM, MAA and EA in the dispersant composition. The polymer product had a weight average molecular weight of 9050 and a number average molecular weight of 4730 as measured by gel permeation chromatography in tetrahydrofuran solvent.

TABLE E

| Designation | AM** | % AM | % MAA | % EA | phr 2-EHMP | phr SEM |
|---|---|---|---|---|---|---|
| P-51 | M-1/M11 | 10/10 | 30 | 50 | 4 | 0 | phr = parts per hundred parts resin.
**See Table B.

EXAMPLE 73

Preparation Of High Solids Titanium Dioxide Slurry

To 2796 grams of solid R-902 titanium dioxide pigment powder (DuPont) was added 774 grams of water, 34 grams of sodium hydroxide (35% solids solution), 379 grams of 24.08% solids of dispersant P-51 in the latex form, and 10 grams of Drewplus® L-475 defoamer (Drew Industrial Division Of Ashland Chemical). This mixture was ground on a high speed disperser for 15 minutes, which was sufficient to provide an excellent degree of dispersion as verified by the grind check paste method. Table F reports the total solids of the slurry.

The grind check method consists of mixing the pigment slurry at 1:5 ratio with a "grind check paste" consisting of the following: 445 grams of 3.5% by weight solution of Natrosol® 250HBR (Hercules), 350 grams of UCAR® latex 367 (Union Carbide Corp.), 3 grams of Drewplus® L-475, 1.5 grams of Nuosept® 95 preservative (Huls), and 17 grams of pathalo blue paste. The grind check paste was added to the pigment slurry under agitation until well mixed, after which a 3 mil film was drawn-down on a plain white chart and allowed to dry in an oven for 10–15 minutes. Scratching the dry film with a razor blade revealed any undispersed pigment aggregates as a white streak: the larger the streak, the larger the pigment agglomerate. A film having an excellent degree of dispersion has no white streaks.

TABLE F

| Titanium Dioxide Slurry | |
|---|---|
| % Titanium Dioxide Solids | 68.38 |
| % Dispersant Solids | 2.23 |
| % Defoamer | 0.3 |
| % Sodium Hydroxide | 0.3 |
| Theo. Slurry Solids % | 70.22 |
| Actual Slurry Solids % | 70.22 |
| Dispersant Solids on Pigment % | 3.25 |

EXAMPLE 74

Colorant Compatibility And Stability Of Vinyl Acrylic Paint

A vinyl acrylic semi-gloss paint was prepared by mixing the following ingredients in sequence: 75.22 grams of water, 2 grams of Triton® N-101 (Union Carbide Corp.), 20 grams of Omyacarb® UF, 306.12 grams of the slurry prepared in Example 73, 2 grams (a first portion) of L-475 defoamer, 441 grams of UCAR® 367 Latex (Union Carbide Corp.), 17 grams of UCAR® IBT Filmer (Union Carbide Corp.), 4 grams of AMP-95® (Angus), 2 grams of Nuosept® 95, 1 gram of Triton® GR-5M (Union Carbide Corp.), 4 grams (a second portion) of L-475 defoamer, 16 grams (25% solids) of UCAR® Polyphobe 102 latex (Union Carbide Corp.), 16 grams (25% solids) of UCAR® Polyphobe 104 latex (Union Carbide Corp.), 147 grams of water, and 2 grams of 50% sodium hydroxide solution. 50 grams of a red-iron oxide (called ROX in Table G below), blue, or black colorant (Huls) were added under agitation for use in the colorant float and compatibility study.

The paint was then characterized by rheological properties (0.3 RPM Brookfield Viscosity, Stormer Viscosity, ICI Viscosity), viscosity stability over time after storage at room temperature and at 140° F. over a 4 week period, in-can separation (colorant float) over a 4 week period, and colorant flocculation over a 4 week period. Colorant float was determined by visually inspecting the degree of separation as manifested by an oily layer containing a high concentration of colorant, appearing richer in color than the rest of the paint. The subjective rating ranges from no separation (None) though very slight (VSL), slight (SL), moderate (MOD), poor (POOR), and severe (SEV). Colorant flocculation was determined by drawing down a 3 mil paint film on a Leneta 3B chart. After allowing the film to dry overnight, a small amount of paint was applied with the tip of a finger on the dry film and rubbed in a circular motion until dry. Rubbing the paint in this way applies shear to the paint as it dried to prevents the pigment from flocculating, and indicates the true color of the paint with well dispersed pigment. Comparing the color of the rubbed-up spot to the rest of the film reveals colorant flocculation. If the colorant has flocculated, the paint film has less color than the rubbed-up spot. If the titanium dioxide has flocculated, the paint film has more color than the rubbed-up spot. The degree of flocculation was rated subjectively from none (None) though very slight (VSL), slight (SL), moderate (MOD), poor (POOR), and severe (SEV). The example in Table G shows that use of associative dispersant greatly improves the colorant float and flocculation, especially when used in combination with thickeners utilizing compatible or similar hydrophobes to those used by the associative dispersant.

TABLE G

| Paint Properties | |
|---|---|
| Flocculation 1 Day | |
| ROX | None |
| Blue | None |
| Black | None |
| Flocculation 1 Wks. | |
| ROX | None |
| Blue | N–VSL-TiO$_2$ |
| Black | None |
| Flocculation 2 Wks. | |
| ROX | VSL |
| Blue | VSL-TiO$_2$ |
| Black | N–VSL |
| Flocculation 4 Wks. | |
| ROX | VSL |
| Blue | VSL-TiO$_2$ |
| Black | N–VSL |
| Brook/ICI          1 Day | |
| Brook/0.3/sp#=3 | 244 |
| Brook/60/sp#=4 | 28 |

TABLE G-continued

| Paint Properties | |
|---|---|
| ICI | 2.1 |
| Stormer (RT) | 88 |
| In-Can Separation 24 HR | |
| ROX | MOD |
| Blue | SL–MOD |
| Black | SL–MOD |
| In-Can Separation 1 Wks | |
| ROX | MOD |
| Blue | MOD |
| Black | MOD |
| In-Can Separation 2 Wks | |
| ROX | MOD |
| Blue | MOD |
| Black | MOD |
| In-Can Separation 4 Wks | |
| ROX | MOD |
| Blue | SL–MOD |
| Black | SL–MOD |
| Paint Base Stormer | |
| Initial | 88 |
| 24 HR RT | 88 |
| 2 WK RT | 94 |
| 2 WK HS | 90 |
| 4 WK RT | 95 |
| 4 WK HS | 92 |
| pH Stability | |
| Initial | 9.1 |
| 24 HR RT | 8.85 |
| 2 WK RT | 8.15 |
| 2 WK HS | 7.7 |
| 4 WK RT | 9.5 |
| 4 WK HS | 7.54 |

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

I claim:

1. A polymer comprising the reaction product of:
   (A) about 1–99.8 weight percent of one or more nonionic, cationic, anionic or amphoteric monomers;
   (B) about 0–98.8 weight percent of one or more monoethylenically unsaturated monomers different from (A);
   (C) about 0.1–98.8 weight percent of one or more monoethylenically unsaturated macromonomers containing a monovalent residue of a substituted or unsubstituted complex hydrophobe compound;
   (D) about 0.1–98.8 weight percent of one or more monoethylenically unsaturated macromonomers containing a monovalent residue of a substituted or unsubstituted hydrophobe compound other than a complex hydrophobe compound;
   (E) about 0–20 weight percent or greater of one or more polyethylenically unsaturated monomers different from (A), (B), (C) and (D); and
   (F) about 0–25 weight percent or greater of one or more acrylates and/or methacrylates derived from a strong acid or a salt of a strong acid different from components (A), (B), (C), (D) and (E).

2. The polymer of claim 1 in which component (A) comprises one or more alpha, beta-monoethylenically unsaturated carboxylic acids.

3. The polymer of claim 1 wherein said monoethylenically unsaturated macromonomer of component (C) is represented by the formula:

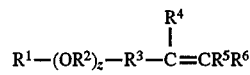

wherein:

$R^1$ is a monovalent residue of a substituted or unsubstituted complex hydrophobe compound;

each $R^2$ is the same or different and is a substituted or unsubstituted divalent hydrocarbon residue;

$R^3$ is a substituted or unsubstituted divalent hydrocarbon residue;

$R^4$, $R^5$ and $R^6$ are the same or different and are hydrogen or a substituted or unsubstituted monovalent hydrocarbon residue; and z is a value of 0 or greater.

4. The polymer of claim 1 wherein said monoethylenically unsaturated macromonomer of component (D) is represented by the formula:

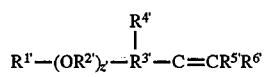

wherein:

$R^{1'}$ is a monovalent residue of a substituted or unsubstituted hydrophobe compound other than a complex hydrophobe compound;

each $R^{2'}$ is the same or different and is a substituted or unsubstituted divalent hydrocarbon residue;

$R^{3'}$ is a substituted or unsubstituted divalent hydrocarbon residue;

$R^{4'}$, $R^{5'}$ and $R^{6'}$ are the same or different and are hydrogen or a substituted or unsubstituted monovalent hydrocarbon residue; and z' is a value of 0 or greater.

5. The polymer of claim 3 wherein the substituted or unsubstituted complex hydrophobe compound is represented by the formula selected from:

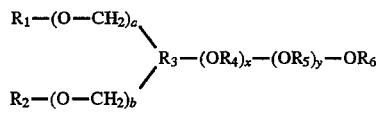

wherein $R_1$ and $R_2$ are the same or different and are hydrogen or a substituted or unsubstituted monovalent hydrocarbon residue, $R_3$ is a substituted or unsubstituted divalent or trivalent hydrocarbon residue, each $R_4$ is the same or different and is a substituted or unsubstituted divalent hydrocarbon residue, each $R_5$ is the same or different and is a substituted or unsubstituted divalent hydrocarbon residue, $R_6$ is hydrogen, a substituted or unsubstituted monovalent hydrocarbon residue or an ionic substituent, a and b are the same or different and are a value of 0 or 1, and x and y are the same or different and are a value of 0 or greater; provided at least two of $R_1$, $R_2$, $R_3$, $R_4$, $R_5$ and $R_6$ are a hydrocarbon residue having greater than 2 carbon atoms in the case of $R_1$, $R_2$ and $R_6$ or having greater than 2 pendant carbon atoms in the case of $R_3$, $R_4$ and $R_5$; and

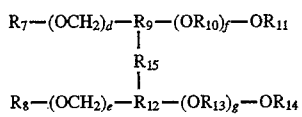

wherein $R_7$ and $R_8$ are the same or different and are hydrogen or a substituted or unsubstituted monovalent hydrocarbon residue, $R_9$ and $R_{12}$ are the same or different and are a substituted or unsubstituted divalent or trivalent hydrocarbon residue, each $R_{10}$ is the same or different and is a substituted or unsubstituted divalent hydrocarbon residue, each $R_{13}$ is the same or different and is a substituted or unsubstituted divalent hydrocarbon residue, $R_{11}$ and $R_{14}$ are the same or different and are hydrogen, a substituted or unsubstituted monovalent hydrocarbon residue or an ionic substituent, $R_{15}$ is a substituted or unsubstituted divalent hydrocarbon residue, d and e are the same or different and are a value of 0 or 1, and f and g are the same or different and are a value of 0 or greater; provided at least two of $R_7$, $R_8$, $R_9$, $R_{10}$, $R_{11}$, $R_{12}$, $R_{13}$, $R_{14}$ and $R_{15}$ are a hydrocarbon residue having greater than 2 carbon atoms in the case of $R_7$, $R_8$, $R_{11}$ an $R_{14}$ or having greater than 2 pendant carbon atoms in the case of $R_9$, $R_{10}$, $R_{12}$, $R_{13}$ and $R_{15}$.

6. The polymer of claim 3 in which said monoethylenically unsaturated macromonomer is represented by the formula:

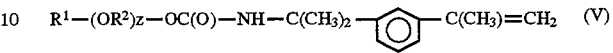

wherein $R^1$, $R^2$ and z are as defined in claim 3.

7. The polymer of claim 1 in which said acrylate and/or methacrylate derived from a strong acid or a salt of a strong acid in Component (F) is present in an amount of from about 0.1 to about 25 weight percent and is 2-sulfoethyl methacrylate.

* * * * *